United States Patent [19]
Henning

[11] Patent Number: 5,237,632
[45] Date of Patent: Aug. 17, 1993

[54] OPTICAL FIBRE COIL ASSEMBLIES

[75] Inventor: Michael L. Henning, Shepton Mallet, United Kingdom

[73] Assignee: GEC-Marconi Limited, Stanmore, England

[21] Appl. No.: 800,351

[22] Filed: Dec. 3, 1991

[30] Foreign Application Priority Data

Dec. 6, 1990 [GB] United Kingdom ............... 9026587

[51] Int. Cl.⁵ .............................................. G02B 6/10
[52] U.S. Cl. .................................... 385/13; 385/147
[58] Field of Search ................. 385/13, 147; 356/345, 356/350

[56] References Cited

U.S. PATENT DOCUMENTS

| | | | |
|---|---|---|---|
| 4,320,475 | 3/1982 | Leclerc et al. | 367/149 |
| 4,525,818 | 6/1985 | Clelo et al. | 367/149 |
| 4,534,222 | 8/1985 | Finch et al. | 73/653 |
| 4,799,202 | 1/1989 | Assard | 367/149 |
| 4,825,424 | 4/1989 | Lamb et al. | 367/141 |
| 4,893,930 | 1/1990 | Garrett et al. | 356/345 |
| 4,951,271 | 8/1990 | Garrett et al. | 367/141 |
| 4,959,539 | 9/1990 | Hofler et al. | 250/227.19 |

FOREIGN PATENT DOCUMENTS

| | | |
|---|---|---|
| 0021945 | 1/1981 | European Pat. Off. . |
| 0277698 | 8/1988 | European Pat. Off. . |
| 0351990 | 1/1990 | European Pat. Off. . |
| 1210280 | 10/1970 | United Kingdom . |
| 2147758 | 5/1985 | United Kingdom . |
| 2197953 | 6/1988 | United Kingdom . |
| 2245359 | 1/1992 | United Kingdom . |
| 8702453 | 4/1987 | World Int. Prop. O. . |

OTHER PUBLICATIONS

K. Oka, T. Takeda and Y. Ohtsuka, "Fiber-Optic Dual-Coil Sensor for Simultaneous Measurements of Mechanical Displacement and Temperature Change,"; Sensors and Actuators, A21-23 (1990) pp. 438-441; (Takeda and Ohtsuka) e.g. FIG. 2.

Primary Examiner—John D. Lee
Assistant Examiner—S. W. Barns
Attorney, Agent, or Firm—Jacobson, Price, Holman & Stern

[57] ABSTRACT

An optical fiber coil assembly comprising two optically interconnected optical fiber coils or coil parts (22, 23) rigidly supported in predetermined positional relationship by respective rigid support means so constructed and arranged that static or quasi-static pressure (P) applied to the assembly produces a decrease in the path length of one of the coils or coil parts, and an increase in the path length of the other.

6 Claims, 2 Drawing Sheets

OPTICAL FIBRE COIL ASSEMBLIES

BACKGROUND OF THE INVENTION

This invention relates to optical fibre sensing systems and relates more specifically to optical fibre coil assemblies for incorporation in such systems as sensors or other component parts (e.g. reference or balancing coils).

In many coherent optical fibre sensing systems sensor and reference or balancing optical fibre coils of approximately the same length are provided. The sensor coil needs to have a greater sensitivity than the reference or balancing coil, a sensitivity ratio of 10:1 probably being adequate.

In the case of interferometer type arrangements a balance (delay) coil and sensor coil are placed in the respective arms of the interferometer. The sensor coil is required to be sensitive to the measurand (e.g. acoustic pressure in the case of hydrophones) and the sensor and balance coils co-operate to maintain coherence of light signals applied to the interferometer and to reduce the phase noise generated after combining the light outputs from the arms of the interferometer.

In the case of a heterodyne optical sensing system of the above kind, the respective lengths of the coils may be adjusted to provide a predetermined path length difference whilst the frequency of light signals applied to the interferometer is ramped. In this way a heterodyne frequency on which the sensed signals are phase modulated is provided at the usual receiver photodiode.

In time-multiplexed pulsed heterodyne optical fibre sensor systems in which, for example, two pulses of slightly different frequencies and of predetermined duration and time relationship are transmitted along a sensor optical fibre having partially reflective discontinuities therealong from which small proportions of the light pulses are reflected back along the fibre at each fibre discontinuity, the signals reflected back from the successive discontinuities are caused to interfere with the signals reflected from the preceding discontinuities in order to produce heterodyning which provides a detectible electrical beat signal the modulation of which is dependant upon changes in length of the optical fibre sensor elements between the discontinuities. In such heterodyne systems there is a need for optical fibre reference coils which are insensitive to the measurand and to other environmental influences which serve to reduce the optical phase noise. This may be achieved as described in our Patent No. GB 2184237, by providing a reference sensor having low sensitivity to the measurand in series with the usual sensors or sensor elements. The reflected output signal from the reference sensor is assumed to be mainly noise from the laser light source for the system or from the environment which is common to all of the sensors or sensor elements of the system. The reflected output from the reference sensor may therefore be subtracted electrically from the other reflected outputs from the sensors or sensor elements in order to cancel the common mode noise.

In another system a reference coil is introduced to minimise a path length imbalance in an optical circuit used for phase detection in order to reduce the common mode phase noise from the laser light source of the system or from environmental sources.

In all the above described arrangements, the reference or balance coil is usually made insensitive by isolation from the measurement. This is reasonably easy at mid acoustic frequencies (above about 200 Hz), but becomes progressively more difficult at lower frequencies. The structures required to mount the coil can become bulky, fragile and not very efficient.

One aspect of the present invention is directed to optical fibre coil assembly constructions, especially applicable to optical fibre hydrophones, in which a reference or balance coil needs to be protected from the influence of air or water-borne acoustic pressures, but it is also applicable to other optical fibre sensing systems in which insensitivity to pressure or mechanical vibrations is required.

BRIEF SUMMARY OF THE INVENTION

According to the present invention there is provided an optical fibre coil assembly comprising two optically interconnected optical fibre coils or coil parts rigidly supported in predetermined positional relationship by rigid support means so constructed and arranged that static or quasi-static pressure applied to the coil assembly produces a decrease in the path length of one of the coils or coil parts, and an increase in the path length of the other.

By employing the present invention it is possible to provide a coil where the effects of pressure can be cancelled. This is preferably achieved by the two coils or coil parts of the assembly, which may be of similar or different lengths, being interconnected in series to form a continuous optical fibre coil. In this way the net overall optical path length change in response to the application of static or quasi-static pressure to the coil assembly is represented by the sum of the optical path length changes in the two coils or coil parts. The coil assembly may therefore have net zero sensitivities when equal and opposite longitudinal strains are applied to the different coils or coil parts under static or quasi-static acoustic pressure and accelerations normal to the axis of the coils or coil parts.

The two coils or coil parts may be cylindrical and arranged concentrically with an air gap being provided between the coils or coil parts or the coils may have a layer of air bearing foam or other material located between them, to prevent interaction between them, although any material could be used which is more compliant that the coil assemblies.

In carrying out the present invention the two optical fibre coils or coil parts may be optically connected together at each end thereof by means of optical couplers, so that the overall net optical fibre path length change, produced in the assembly in response to the application of static or quasi-static pressure, is the difference between the path length changes in the respective coils or coil parts, which may be of the same or slightly different fibre lengths. In this way the coil assembly will be particularly sensitive to acoustic or static pressure, acting as an interferometer, but as the path lengths of the two coils or coil parts are substantially equal, laser phase noise etc. in the input signal will be cancelled.

BRIEF DESCRIPTION OF THE DRAWINGS

By way of example the present invention will now be described with reference to the accompanying drawings in which.

DETAILED DESCRIPTION OF THE DRAWINGS

Figure 1:
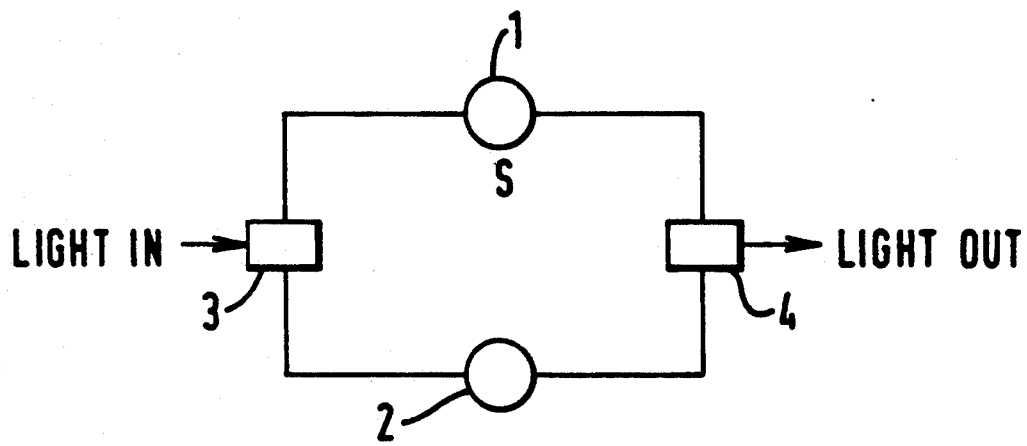
FIG. 1 shows a schematic diagram of an optical interferometer including a reference coil having low sensitivity.

Referring to FIG. 1 of the drawings there is shown an optical interferometer which comprises two optical paths in parallel one of which includes an optical fibre sensor 1 and the other of which includes an optical fibre balancing or delay coil 2, which will usually be of the same length as the sensor coil 1 although a small path difference may be provided.

Coherent light signals applied to the interferometer from a laser source (not shown) are divided equally between the two paths of the interferometer by means of beam splitter 3 and the light in the two paths is recombined by means of a combiner or coupler 4 before being applied to photodetector means (not shown). The sensor coil 1 may be used, for example, to detect underwater acoustic pressure in the case of a hydrophone whereas the reference coil 2 which is provided to maintain coherence of the light signal and to reduce phase noise in the output from the photodetector means needs to have low sensitivity to the acoustic pressure.

Figure 2:
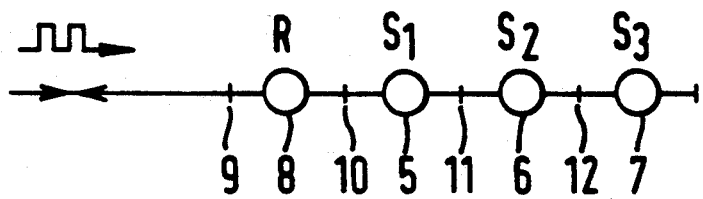
FIGS. 2 and 3 show schematic diagrams of different optical sensing systems incorporating optical fibre reference coils having low sensitivity; and, FIGS. 4 to 6 show various forms of optical fibre coil assembly constructions in accordance with the present invention for incorporation in the interferometer of FIG. 1 or the optical sensing systems of FIGS. 2 and 3.

In the case of the optical sensing system shown in FIG. 2 the systems comprises serially connected optical fibre sensors 5, 6 and 7 and an optical reference coil 8. Partially reflective discontinuities or splices are provided at 10, and 12. The reference coil 8 needs to have low sensitivity to the underwater acoustic pressure to be sensed by the sensor coils 5 to 7 since the reflected output from the reference coil is required to be dependent upon the noise generated in the laser light source for light pulse signals applied to the input of the system and generated by other environmental sources but is not to be dependant on the measurand. The reflected output from the reference coil 8, which represents noise to which all the sensor coils 5 to 7 are subjected, is subtracted electrically from the respective outputs from the sensors 5 to 7 in order to cancel out the common mode noise.

Figure 3:
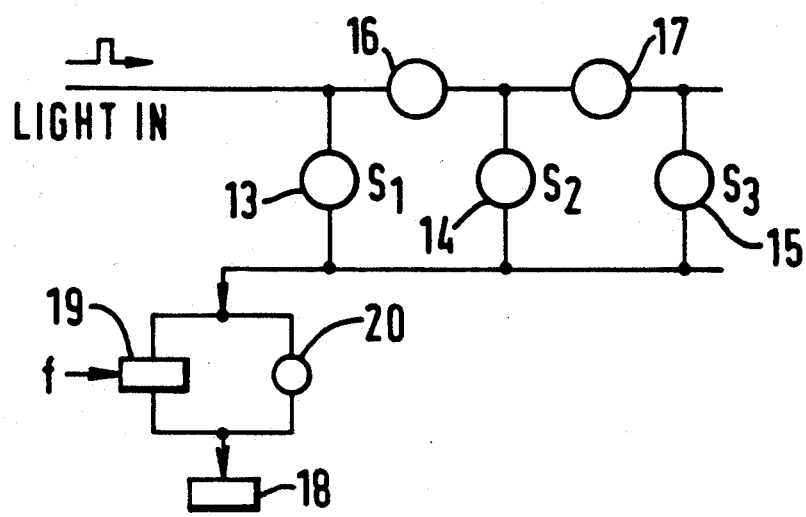

Referring now to FIG. 3 this shows an optical fibre system in which sensor coils 13, 14 and 15 are connected in parallel with the interposition of optical delay coils 16 and 17 in order to delay the arrival of the light input to coils 14 and 15 relative to coil 13 and to each other.

The delayed outputs from the sensor coils 13, 14 and 15 are applied to a photodiode 18 after being frequency shifted by a frequency shifter 19. An optical fibre balance coil 20 is connected across the frequency shifter in order to minimise the path length imbalance in the optical circuit for phase detection, thereby reducing common mode phase noise from the laser source or from the environment.

Figure 4:
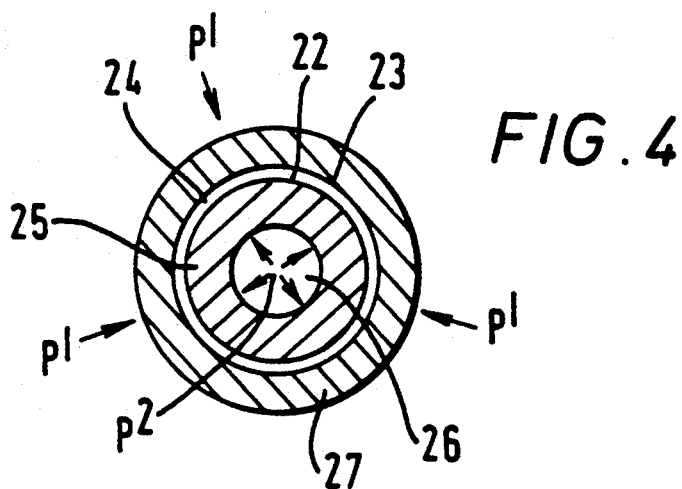

Referring to FIG. 4, this shows an optical fibre coil assembly according to the invention which may be used in any of the systems according to FIGS. 1 to 3.

The coil assembly illustrated is insensitive to static pressure and quasi-static acoustic pressure and to acceleration along two axes.

A continuous optical fibre coil comprises two concentric coil parts 22 and 23 which are rigidly supported on the respective sides of a cylindrical air cavity or air-bearing material 24 or material having a low bulk modulous. The inner coil part 22 is rigidly supported by being wound on to a hollow cylindrical mandrel 25 the central opening 26 of which can be filled with the medium (e.g. water) in which the sensor coil is to be located for detecting static pressure (e.g. acoustic pressure) or it may be filled with another appropriate material. The outer coil part 23 is rigidly supported by means of a cylindrical structure or encapsulant 27.

The major effect of hydrostatic or quasi-hydrostatic pressure on the coiled optical fibre of the coil assembly is through the transverse or radial forces rather than through forces in directions parallel to the axis of the cylindrical assembly. Thus the inner coil part 22 is subjected to tensile forces $P^2$ tending to increase its diameter along its length whereas the compressive forces $P^1$ acting on the outer coil parts 23 tend to reduce the diameter and thus the length of the fibre forming this coil part. By suitable choice of dimensions, materials and fibre lengths of the respective coils or coil parts 22 and 23 the two fibre length changes will be mutually canceling thereby producing a coil assembly insensitive to pressure. The following Tables I and II indicate exemplary constructional details of optical fibre coil assemblies and their expected acoustic sensitivities for two sets of parameters when the cylindrical cavity 24 is filled with air or an air bearing material.

TABLE I

|  | Case 1 | Case 2 |
|---|---|---|
| Inner Diameter of Assembly (nominal, mm) | 30 | 30 |
| Mean fibre coil/air assembly diameter (mm) | 38 | 42 |
| Outer diameter (nominal, mm) | 45 | 60 |
| Glass layer thickness (mm) | 1 | 1 |
| Length proportion (nominal) | 0.601 | 0.56 |
| Modulus of encapsulant and mandrel (GPa) | 5 | 5 |
| Poisson's ratio | 0.35 | 0.35 |
| Mean glass assembly modulus (GPa) | 9 | 9 |

TABLE II

| Inner Diameter (mm) | Outer Diameter (mm) | Length Proportion (Inner Coil/Total) | Sensitivity re1rad/$\mu$Pa/metre |
|---|---|---|---|
| Case 1 | | | |
| Nominal | Nominal | Nominal | −240 dB |
| Nominal | Nominal | 0.58–0.62 | <−200 dB |
| 30.6–29.3 | Nominal | Nominal | <−200 dB |
| Nominal | 46–44.2 | Nominal | <−200 dB |
| Case 2 | | | |
| Nominal | Nominal | Nominal | −251 dB |
| Nominal | Nominal | 0.525–0.595 | <−200 dB |
| 31.2–28.6 | Nominal | Nominal | <−200 dB |
| Nominal | 65.5–56.5 | Nominal | <200 dB |

As will be observed, the sensitivity can be reduced to near zero but with even quite large imbalances in component values the sensitivity is still markedly reduced.

Figure 5:
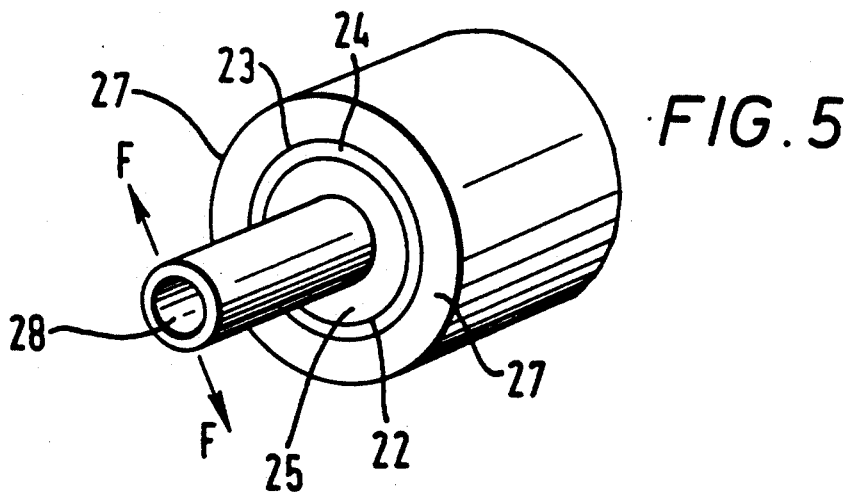

It will be appreciated from FIG. 5 that cancellation of sensitivity can also be achieved when the coil assembly undergoes acceleration at right angles to the axis of the cylindrical assembly. If the cylindrical assembly is driven from an internal mandrel 28 the opposite effects will influence the inner and outer coil parts 22 and 2 respectively on opposite sides of the intervening air cavity thereby tending to cancel sensitivity.

In order to construct the coil assembly of FIG. 4 the coil part 22 may be wound on to the mandrel 25 after which a layer of foam effectively providing an air-bearing layer of material instead of the air cavity is applied over the coil part 22. The outer coil part 23 is then wound on to the foam and then encapsulated to provide the cylinder 28. End plates (not shown) suitably designed are then secured over the ends of the coil assembly in order to render the assembly water tight for underwater use or to protect it for use in air.

The rigid construction of the coil assembly prevents vibrational perturbation of the optical fibre coils which would occur if the coils were suspended in air in order to be insulated from acoustic influences.

Figure 6:
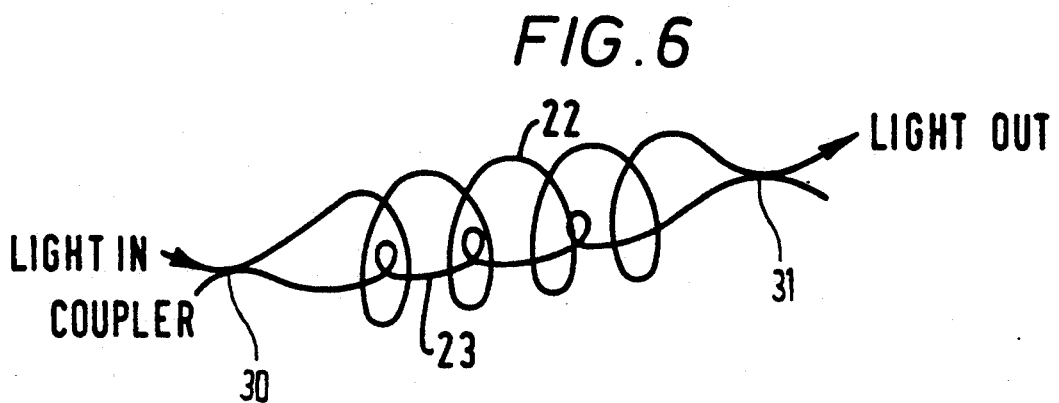

The two coil parts 22 and 23 of the coil assembly may be connected in series to provide a single coil as described for use as reference or balance coils in the arrangement depicted in FIGS. 1 to 3. Alternatively, the coil parts 22 and 23 may be optically coupled by means of two optical couplers 30 and 31 as depicted in FIG. 6. In this case light passing through one coil is coupled to the other coil and then the signals emerging from the two coils are effectively subtracted. Any noise on the input signal, such as laser phase noise, will be cancelled. However any change in the measurand will have an effect on each of the coils providing a sensitive interferometer arrangement. The mechanical and dimensional parameters can be suitably adjusted to provide the requisite overall sensitivity, by simply siting the coil parts in different parts of the coil assembly or by adjusting materials parameters or both.

What we claim is:

1. An optical fibre coil assembly comprising two optically interconnected optical fibre coils or coil parts rigidly supported in predetermined positional relationship by rigid support means, so constructed and arranged that static or quasi-static pressure applied to the assembly produces a decrease in the path length of one of the coils or coil parts, and an increase in the path length of the other, in which the two coils or coil parts of the assembly are interconnected in series in order to form a continuous coil so that the net overall optical path length change in response to the application of static or quasi-static pressure to the coil assembly is the sum of the optical path length changes in the two coils or coil parts.

2. An optical fibre coil assembly as claimed in claim 1, in which the coils or coil parts are substantially the same length.

3. An optical fibre coil assembly as claimed in claim 2, in which the rigid support means comprises a hollow mandrel on which one of the two coils or coil parts is wound and a rigid hollow body which supports the second of the two coils or coil parts and in which the two coils or coil parts are separated by material which is more compliant than the two coils or coil parts.

4. An optical fibre coil assembly as claimed in claim 3, wherein the compliant material is air bearing material (e.g. foam).

5. An optical fibre coil assembly as claimed in claim 3, in which the rigid support means are of hollow cylindrical form and arranged concentrically.

6. An optical fibre coil assembly as claimed in claim 1, wherein the characteristics and dimensions of the coils or coil parts are such that the application of static or quasi-static pressure produces equal and opposite path length changes in the two coils or coil parts.

* * * * *